United States Patent [19]

Sugimoto

[11] 4,311,473
[45] Jan. 19, 1982

[54] RETAINING DEVICE FOR A MULTI-STAGE SPROCKET ASSEMBLY

[75] Inventor: Kazuo Sugimoto, Sakai, Japan

[73] Assignee: Shimano Industrial Company Limited, Osaka, Japan

[21] Appl. No.: 100,294

[22] Filed: Dec. 5, 1979

[30] Foreign Application Priority Data

Dec. 12, 1978 [JP] Japan ............................ 53-171205[U]

[51] Int. Cl.³ ........................ F16H 55/12; F16H 55/30
[52] U.S. Cl. ..................................... 474/160; 403/328;
403/DIG. 7; 411/517; 192/64; 474/165;
403/326
[58] Field of Search ............... 474/152, 158, 160, 165;
192/64, 6 R, 6 A, 6 B; 403/326, 155, 328, 329,
DIG. 7; 85/8.8, 8.3; 411/517, 518

[56] References Cited

U.S. PATENT DOCUMENTS

| 2,220,610 | 11/1940 | Miller | 403/328 X |
|---|---|---|---|
| 2,903,209 | 9/1959 | Strub | 403/326 X |
| 3,865,499 | 2/1975 | Flichy | 403/326 |
| 3,900,088 | 8/1975 | Ozaki | 474/160 X |
| 4,047,603 | 9/1977 | Ozaki | 474/160 X |
| 4,089,231 | 5/1978 | Segawa | 474/160 |
| 4,102,215 | 7/1978 | Nagano et al. | 474/160 |
| 4,116,319 | 9/1978 | Nagano et al. | 474/160 X |
| 4,121,474 | 10/1978 | Arregui Suinaga | 474/160 |
| 4,124,107 | 11/1978 | Kine | 474/160 X |
| 4,182,194 | 1/1980 | Tomozawa | 474/160 |

FOREIGN PATENT DOCUMENTS

| 674162 | 6/1966 | Belgium | 403/329 |
|---|---|---|---|
| 2317108 | 2/1977 | France . | |
| 558485 | 1/1975 | Switzerland . | |

*Primary Examiner*—C. J. Husar
*Assistant Examiner*—Moshe I. Cohen
*Attorney, Agent, or Firm*—Stevens, Davis, Miller & Mosher

[57] ABSTRACT

A multi-stage sprocket assembly comprises a cylindrical member and a sprocket group and has therebetween a retaining device for preventing the sprocket group from axial movement with respect to the cylindrical member, the retaining device comprising an engaging groove extending circumferentially of the cylindrical member and an engaging member elastically engageable with the engaging groove and disengageable therefrom against the elastic engagement force. The engaging member engages with the engaging groove to mount the sprocket group to the cylindrical member in relation of being axially immovable and disengages from the groove to remove the sprocket group from the cylindrical member.

6 Claims, 5 Drawing Figures

RETAINING DEVICE FOR A MULTI-STAGE SPROCKET ASSEMBLY

BACKGROUND AND SUMMARY OF THE INVENTION

This invention relates to a multi-stage sprocket assembly, and more particularly to a multi-stage sprocket assembly comprising a cylindrical member and a group of two or more different size sprockets coupled with the cylindrical member at the outer periphery thereof.

Generally, this kind of multi-stage sprocket assembly has at the outer periphery of the cylindrical member a number of axially extending retaining grooves. A screw thread is provided at the outer periphery of one axial end of the cylindrical member and a plurality of sprockets having at the inner periphery of their central bores a number of projections engageable with the retaining grooves, are fit onto the cylindrical member sequentially from a larger diameter sprocket to a smaller diameter sprocket at regular intervals the sprockets being spaced by washers. The smallest diameter sprocket has at its inner periphery a screw thread and is screwed with the screw thread at the cylindrical member. Alternatively, all the sprockets have a screw thread and are screwed with a screw thread formed throughout the outer periphery of cylindrical member. In either case, the sprockets are coupled with the cylindrical member.

Such coupling makes assembly or removal of the sprockets onto or from the cylindrical member difficult, especially when the sprockets have been in use.

The invention has been designed to overcome this problem. An object of the invention is to provide a multi-stage sprocket assembly capable of facilitating coupling or removal of the sprockets with or from the cylindrical member.

The multi-stage sprocket assembly of the invention comprises a cylindrical member and a sprocket group, and a retaining means between them for preventing the sprocket group from axially moving with respect to the cylindrical member. The retaining means comprises an engaging groove extending circumferentially of the cylindrical member and an engaging member elastically engageable with and disengageable from the groove the latter being against the engagement elasticity. The engaging member engages with the engaging groove to mount the sprocket group axially immovably to the cylindrical member and disengages from the groove to remove the sprocket group from the cylindrical member.

The sprocket group of the invention comprises two or more sprockets and one or more ring-like shaped washers for keeping the sprockets spaced at regular intervals, the sprockets and washers being coupled integrally with each other by means of a coupling means. The respective sprockets have a central bore insertable onto the outer periphery of the cylindrical member. At the inner periphery of each central bore are provided projections engageable with retaining grooves which are formed at the outer periphery of the cylindrical member extending axially thereof.

The engaging groove of the retaining means is preferably formed at the outer periphery of the cylindrical member and the engaging member is provided at the sprocket group, for example, at the washer thereof. The engaging member is formed of an elastic wire, having a portion elastically engaging with the engaging groove. Alternatively, a C-like shaped ring of elastic wire separate from the engaging member is formed to catch the engaging member to thereby allow it to elastically engage with the engaging groove through the ring.

According to the invention, the sprocket group is mountable to the cylindrical member in a single operation and is axially immovable with respect to the cylindrical member through engagement of the engaging member with the engaging groove, and is easily and quickly removable from the cylindrical member upon release of the engagement.

These and other objects and novel features of the invention will be more apparent from the following description taken in accordance with the accompanying drawings.

DETAILED DESCRIPTION OF THE INVENTION

Figure 1:
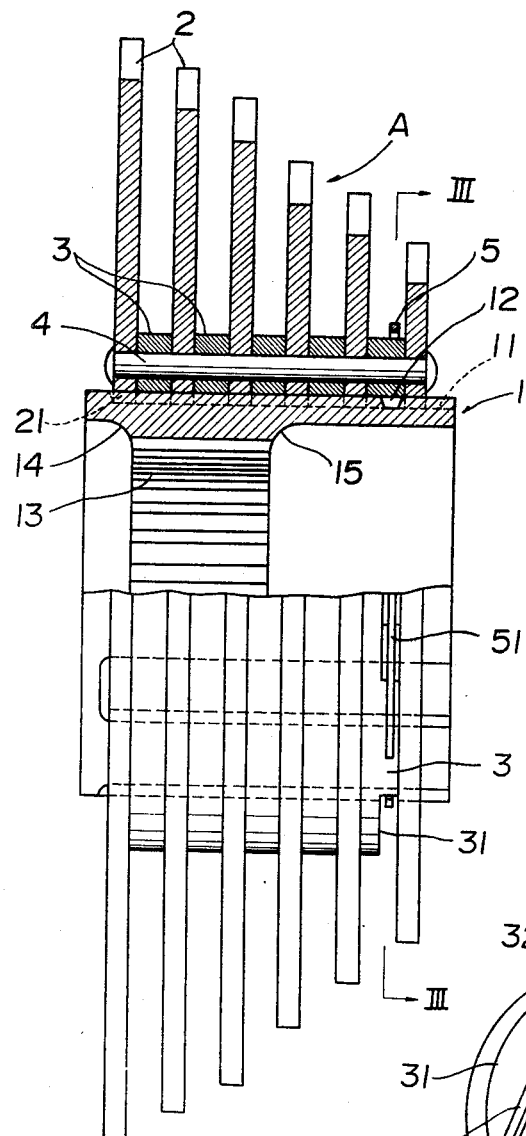
FIG. 1 is a partially cutaway front view of an embodiment of a multi-stage sprocket assembly of the invention.

Referring to the drawings, reference numeral 1 designates a cylindrical member which is provided at the outer periphery thereof with a plurality of retaining grooves 11 extending axially of the cylindrical member and one engaging groove 12 extending circumferentially thereof and in continuation of the retaining grooves 11. The engaging groove 12 together with an engaging member 5 to be hereinafter described constitutes a retaining means, and is formed at the cylindrical member 1 as shown in FIG. 1. The retaining means may also be provided at a sprocket group A to be hereinafter described.

The cylindrical member 1 serves as a driving member of a multi-stage freewheel assembly and has at the inner periphery ratchet teeth 13 in mesh with pawls at a driven member at the freewheel and ball assembly races 14 and 15 provided at both axial sides of ratchet teeth 13.

In the drawings, reference numeral 2 designates sprockets assembled onto the cylindrical member 1. The individual sprockets 2 have different diameters and different numbers of teeth provided at the sprocket outer periphery. Each sprocket has a central bore insertable onto the outer periphery of cylindrical member 1, the central bore having at its inner periphery a plurality of projections 21 engageable with the retaining grooves 11 respectively.

The sprockets 2 also are spaced at regular intervals through ring like washers and are coupled integrally with each other by coupling means 4, such as bolts and nuts or caulking pins, to thereby form the sprocket group A.

The sprocket group A is provided with an engaging member 5 which, together with the engaging groove 12, forms the retaining means.

Figure 2:
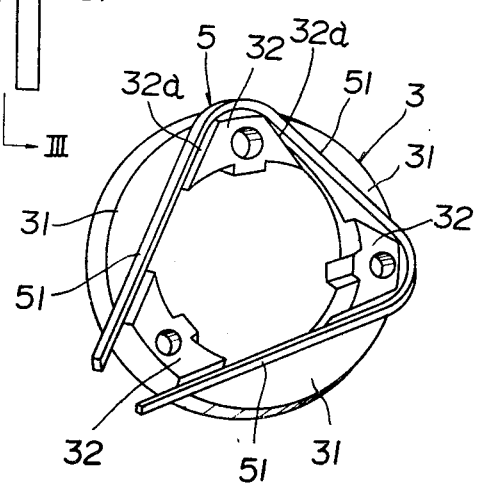
FIG. 2 is a perspective view of a washer carrying an engaging member.
Figure 3:
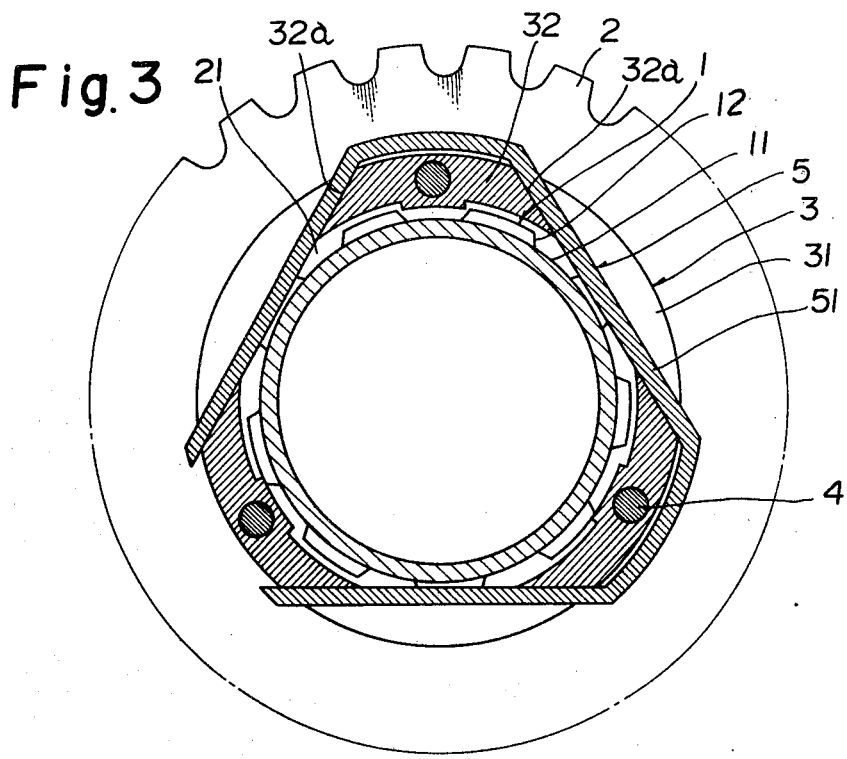
FIG. 3 is a sectional view taken on the line III—III in FIG. 1, and FIGS. 4 and 5 are sectional views of modified embodiments, corresponding to FIG. 3.
Figure 5:
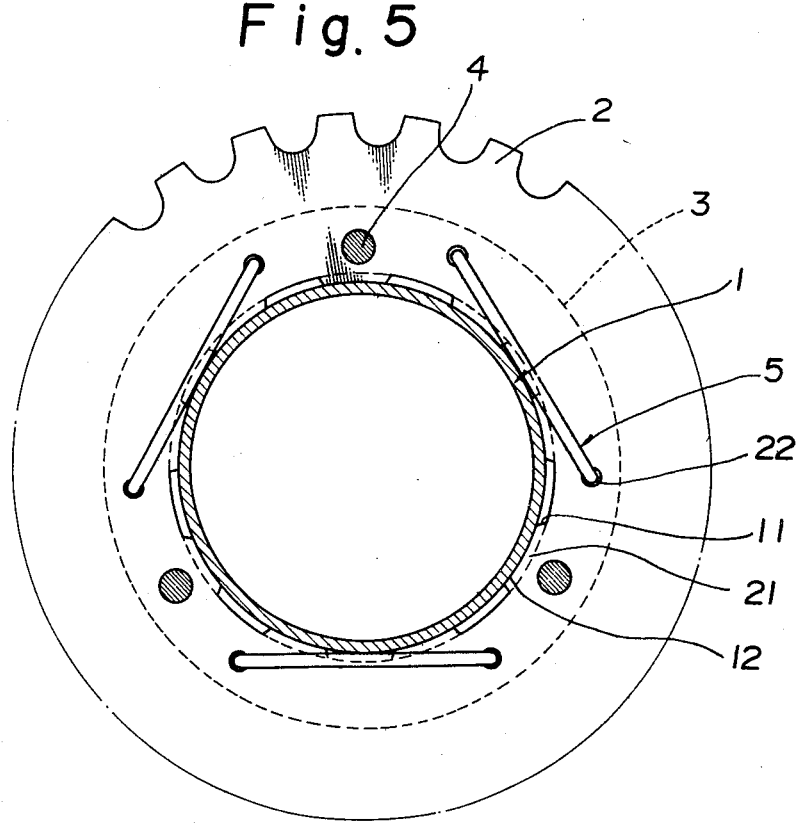

The engaging member 5 is adapted to elastically engage with the engaging groove 12 and be disengaged therefrom upon the application of disengagement force sufficient to overcome the force of elasticity holding the engagment. The engaging member 5, when the engaging groove 12 is formed at the cylindrical member 1, is provided at the sprocket group A as shown, however, when the groove is formed at sprocket groups A, the engaging member 5 is provided at the cylindrical member 1. In the former case, the engaging member 5 is provided at one washer 3 as shown in FIGS. 1 through 3, or at one sprocket 2 as shown in FIG. 5. The washer 3, when carrying the engaging member 5, is formed of thin portions 31 each smaller in thickness than a gap between the sprockets 2, and of interval control portions 32 circumferentially arranged between the thin portions 31 at regular intervals. The interval control portions 32 are thick corresponding to the gap between the sprockets 2, and each has holding faces 32a adjacent to the thin portions 31 respectively.

The engaging member 5, as shown in FIGS. 2 and 3, is formed of an elastic wire, and has a plurality of straight portions 51 (three portions are shown) connecting the holding faces 32a respectively, and is cut at only one portion, thereby being held elastically by the interval control portions 32. The straight portions 51, when the wire is held to the interval control portions 32, are positioned at the thin portions 31 and project radially inwardly from the inner peripheries thereof, so that the projecting portions may engage with the engaging groove 12 at the outer periphery of the cylindrical member 1.

With this construction, the sprocket group A is inserted onto the outer periphery of the cylindrical member 1 through the projections 21 of each sprocket 2, which are fit into the retaining grooves 11, forming an assembly in which the sprocket group is nonrotatable circumferentially with respect to the cylindrical member 1.

During insertion the sprocket group A is axially said onto the cylindrical member, until the straight portions 51 of engaging member 5 held to the washer 3 which project radially inwardly from the outer periphery of the cylindrical member 1 contact with the axially end face of the cylindrical member. Then, the engaging member 5, which is formed of a substantially triangular elastic wire cut at one portion to permit diametric expansion, is expanded to permit further axial sliding of the sprocket group A along cylindrical member until the engaging member 5 reaches the engaging groove 12 and automatically insertably engages therewith. Thus, engagement of the engaging member 5 with the engaging groove 5 and that of the respective projections 21 with the retaining grooves 11, can secure the sprocket group A to the cylindrical member 1 in relation of being immovable axially and circumferentially thereof.

The sprocket group A is easily removable from the cylindrical member 1 by inserting a rod-like member into one retaining groove 11 to elastically expand the engaging member 5 radially outwardly thereof, so that the engaging member 5 disengages from the engaging groove 12. Then the sprocket group A together with the rod-like member is slid toward one axial side (rightward in FIG. 1) of the cylindrical member 1.

The engaging groove 12 is inwardly tapered at opposite side walls as shown in FIG. 1 to ensure the engagement of engaging member 5 with the engaging groove 12 and eliminate an axial backlash of the sprocket group A.

When, the engaging member 5 is provided at one sprocket 2 it is formed of a plurality of elastic wires, supported by supporting bores 22 which are provided at the sprocket as shown in FIG. 5. The wires are inserted at both ends thereof into the bores 22 and supported thereto such that an intermediate portion of each wire of the engaging member 5 projects radially inwardly from the inner periphery of the sprocket 2 to thereby engage with the engaging groove 12.

Figure 4:
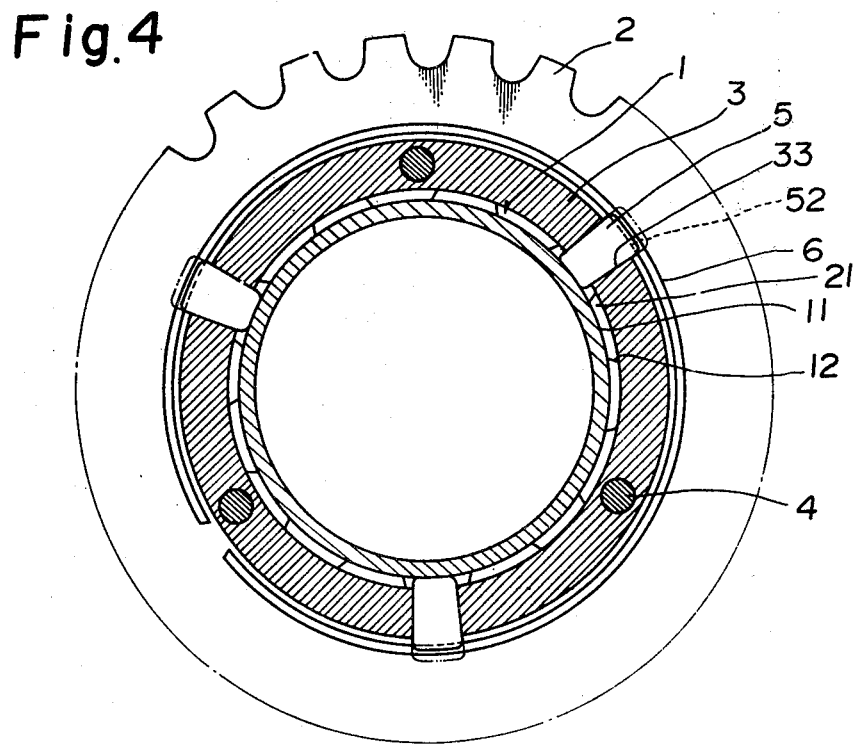

The engaging members 5 shown in FIGS. 1 through 3 and 5, are themselves elastic members. As an alternative, an elastic member, such as a snap ring 6, separate from the engaging member 5 may be formed as shown in FIG. 4 for elastically engaging the engaging member 5 with the engaging groove 12. In either case, the engaging member 5 is elastically engageable with the engaging groove 12.

The modified embodiment shown in FIG. 4, includes a washer 3 provided with a plurality of through bores 33, and the engaging member 5 comprises a plurality of blocks larger in length than the through bores 33 respectively. Each block has at one lengthwise end a groove 52 and is biased radially inwardly of the washer 3 by a C-like shaped snap ring 6 surrounding the outer periphery of the washer 3 which fits into the groove 52, whereby the engaging member 5 elastically engages with the engaging groove 12.

In FIG. 4, the snap ring 6 is expanded in diameter to allow the engaging member 5 to engage with or disengage from the engaging groove 12. As a result, disengagement of the engaging member 5 from the engaging groove 12 facilitates quick removal of the sprocket group A from the cylindrical member 1.

In addition, the engaging groove 12 shown in FIG. 4 is tapered radially inwardly at both opposite side walls, so that the sprocket group A is significantly axially biased to slide the blocks of the engaging member 5 radially outwardly of the washer 3 along the tapered wall of engaging groove 12 to thereby allow the ring 6 to expand in diameter by itself. This further facilitates easy removal of sprocket Group A from the cylindrical member 1.

As a further modification to the above described embodiments, where the engaging groove 12 is at the cylindrical member 1 and the engaging member 5 is at the sprocket group A, the engaging groove 12 may be provided at the sprocket group A and the engaging member 5 may be provided at cylindrical member 1. The sprocket assembly of the invention constitutes a freewheel at the rear hub of the bicycle, but the described sprocket assembly is also applicable to multistage sprockets at bicycle crank means.

As clearly understood from the above description, the multi-stage sprocket assembly of the invention is so constructed that a plurality of sprockets are coupled with each other by coupling means to form a sprocket group, the sprocket group being mounted to the cylindrical member in relation of being axially immovable through elastic engagement of the engaging member with the engaging groove. Hence, the sprocket group is simply mountable in a single operation to the cylindrical member and is readily removable therefrom, and the mounted sprocket group is immovable axially and circumferentially with respect to the cylindrical member.

As many apparently widely different embodiments of this invention may be made without departing from the spirit and scope thereof, it is to be understood that the invention is not limited to the specific embodiments thereof except as defined in the appended claims.

What is claimed is:

1. A multi-stage sprocket assembly comprising a cylindrical member, a sprocket group mounted onto the outer periphery of said cylindrical member, and retaining means provided between said cylindrical member and said sprocket group for preventing said sprocket group from axially moving with respect to said cylindrical member; said cylindrical member having at its outer periphery a plurality of retaining grooves extending axially of said cylindrical member; said sprocket group having two or more different diameter sprockets, one or more ring-like shaped washers positioned between the respective sprockets for keeping them spaced at regular intervals, and coupling means for coupling said sprockets integrally with said washers; each of said sprockets having a central bore fit to the outer periphery of said cylindrical member and being provided at the inner periphery of said central bore with a plurality of projections engageable with said retaining grooves respectively, said retaining means comprising an engaging groove extending circumferentially of said cylindrical member and an engaging member elastically engageable with said engaging groove and disengageable therefrom against the force of elastic engagement, said engaging groove being provided at said cylindrical member and said engaging member being supported by one of said washers, so that said engaging member elastically engages with said engaging groove to retain said sprocket group to said cylindrical member to prevent relative axial movement between them and said engaging member is disengageable from said engaging groove to remove said sprocket group from said cylindrical member.

2. A multi-stage sprocket assembly according to claim 1, wherein said engaging groove provided at the outer periphery of said cylindrical member has slanting opposite side walls so as to be inwardly tapered.

3. A multi-stage sprocket assembly according to claim 1, wherein said engaging member comprises an elastic wire which is supported to said one washer at said sprocket group.

4. A multi-stage sprocket assembly according to claim 3, wherein said washer comprises thin portions each smaller in thickness than a gap between the respective sprockets at said sprocket group and a plurality of interval control portions arranged between said thin portions at uniform intervals, said interval control portions each having holding faces adjacent to said thin portions for said engaging member, said engaging member having a plurality of straight portions connecting each of said holding faces, said straight portions being continuous except for one portion and being held elastically to said plurality of interval control portions, so that said straight portions, when held to said interval control portions, are positioned at said thin portions projecting radially inwardly from the inner periphery of said washer, said projecting straight portions engaging with said engaging groove provided at the outer periphery of said cylindrical member.

5. A multi-stage sprocket assembly according to claim 1, wherein said engaging member comprises a plurality of engaging members, each of said engaging members being of a block-like shape and being elastically supported to said one washer at said sprocket group.

6. A multi-stage sprocket assembly according to claim 5, wherein said washer has a plurality of through bores extending radially of said washer, each of said engaging members is larger in length than each of said through bores and is supported freely movably therein, and a C-like shaped snap ring of elastic wire to engages with the outer surface of each of said engaging members biasing each of said engaging members radially inwardly of said washer to thereby allow each of said engaging members to engage at the innermost end thereof with said engaging groove formed at the outer periphery of said cylindrical member.

* * * * *